(12) United States Patent
Karaila

(10) Patent No.: US 11,171,947 B2
(45) Date of Patent: Nov. 9, 2021

(54) METHOD FOR AUTHENTICATING A USER

(71) Applicant: Volvo Car Corporation, Gothenburg (SE)

(72) Inventor: Ville Karaila, San Jose, CA (US)

(73) Assignee: Volvo Car Corporation, Gothenburg (SE)

( * ) Notice: Subject to any disclaimer, the term of this patent is extended or adjusted under 35 U.S.C. 154(b) by 351 days.

(21) Appl. No.: 15/986,880

(22) Filed: May 23, 2018

(65) Prior Publication Data

US 2018/0375855 A1 Dec. 27, 2018

(30) Foreign Application Priority Data

Jun. 21, 2017 (EP) .................................... 17177124

(51) Int. Cl.
*H04L 29/06* (2006.01)
*H04W 12/08* (2021.01)
(Continued)

(52) U.S. Cl.
CPC ........ *H04L 63/0853* (2013.01); *H04L 63/107* (2013.01); *H04W 4/40* (2018.02);
(Continued)

(58) Field of Classification Search
CPC ...... H04B 10/116; H04L 63/083–0846; H04L 63/0853; H04L 63/0876; H04L 63/107;
(Continued)

(56) References Cited

U.S. PATENT DOCUMENTS

2015/0099466 A1 4/2015 Narendra et al.
2015/0135336 A1* 5/2015 Arasavelli ............. H04L 63/102
726/29

(Continued)

FOREIGN PATENT DOCUMENTS

CN 101952830 A 1/2011
CN 103903319 A 7/2014
(Continued)

OTHER PUBLICATIONS

Aug. 22, 2017 European Search Report issue on International Application No. EP17177124.
CN Office Action 2018105949285.

*Primary Examiner* — Kevin Bechtel
(74) *Attorney, Agent, or Firm* — Clements Bernard Walker; Christopher L. Bernard

(57) ABSTRACT

The present invention relates to a method and a system for authentication of a user for granting access to a service, the method comprising: receiving, by a vehicle control unit comprised in a vehicle, an authentication token based on a request for authentication for access to the service, the vehicle being in communicative connection with a remote server. A token sequence is sent by flashing with a light-emitting device comprised in the vehicle, the token sequence is based on the authentication token. The token sequence is received by a light detecting device. The token is compared by the server with the authentication token. When the token sequence is determined to match the authentication token, access is granted to the service. The invention also relates to a vehicle implementing the method.

19 Claims, 4 Drawing Sheets

(51) Int. Cl.
*H04W 12/06* (2021.01)
*H04W 4/44* (2018.01)
*H04W 4/40* (2018.01)
H04W 4/02 (2018.01)
H04W 12/63 (2021.01)

(52) U.S. Cl.
CPC ............. *H04W 4/44* (2018.02); *H04W 12/06* (2013.01); *H04W 12/08* (2013.01); *H04W 4/02* (2013.01); *H04W 12/63* (2021.01)

(58) Field of Classification Search
CPC ........... H04W 4/02; H04W 4/40; H04W 4/44; H04W 4/70; H04W 12/00503; H04W 12/00504; H04W 12/0051–00512; H04W 12/06–0808
See application file for complete search history.

(56) References Cited

U.S. PATENT DOCUMENTS

| | | | |
|---|---|---|---|
| 2016/0127473 A1 | 5/2016 | Khan et al. | |
| 2016/0147990 A1 | 5/2016 | Schneider | |
| 2017/0094513 A1* | 3/2017 | Kelts | H04L 67/04 |
| 2018/0202822 A1* | 7/2018 | DeLizio | B60R 25/24 |

FOREIGN PATENT DOCUMENTS

| | | |
|---|---|---|
| CN | 104346424 A | 2/2015 |
| CN | 104778384 A | 7/2015 |
| CN | 106059915 A | 10/2016 |
| EP | 2725758 A1 | 4/2014 |
| GB | 2516377 A | 1/2015 |
| WO | 2017004070 A1 | 1/2017 |

\* cited by examiner

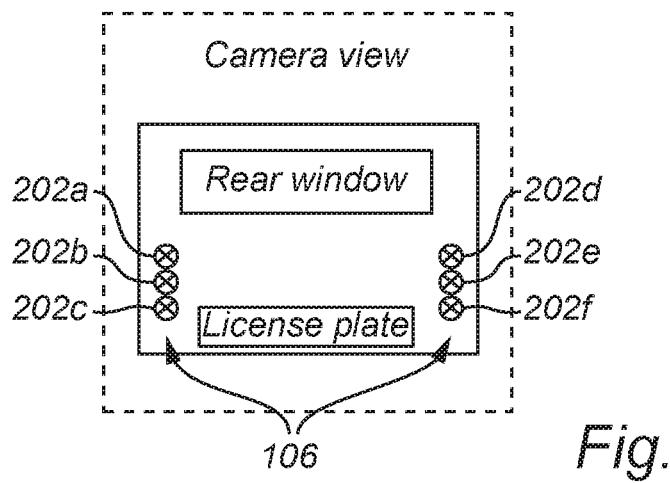
Fig. 2a
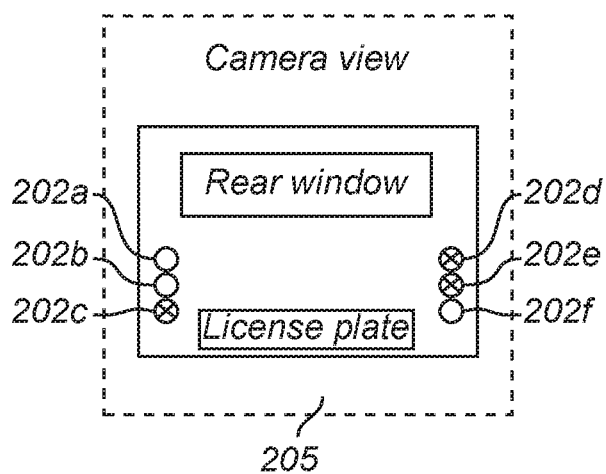
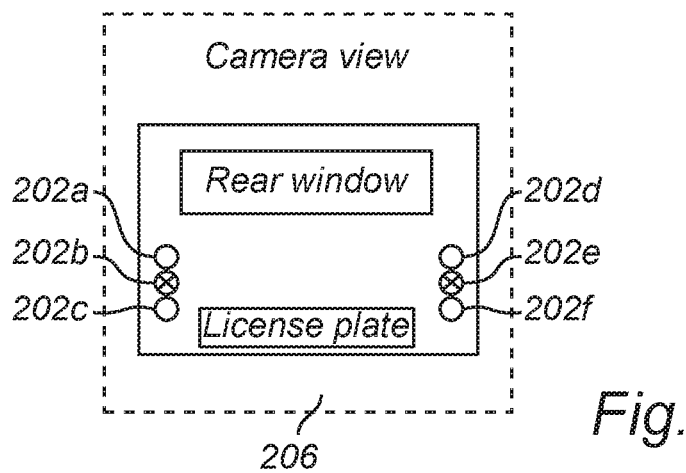
Fig. 2b

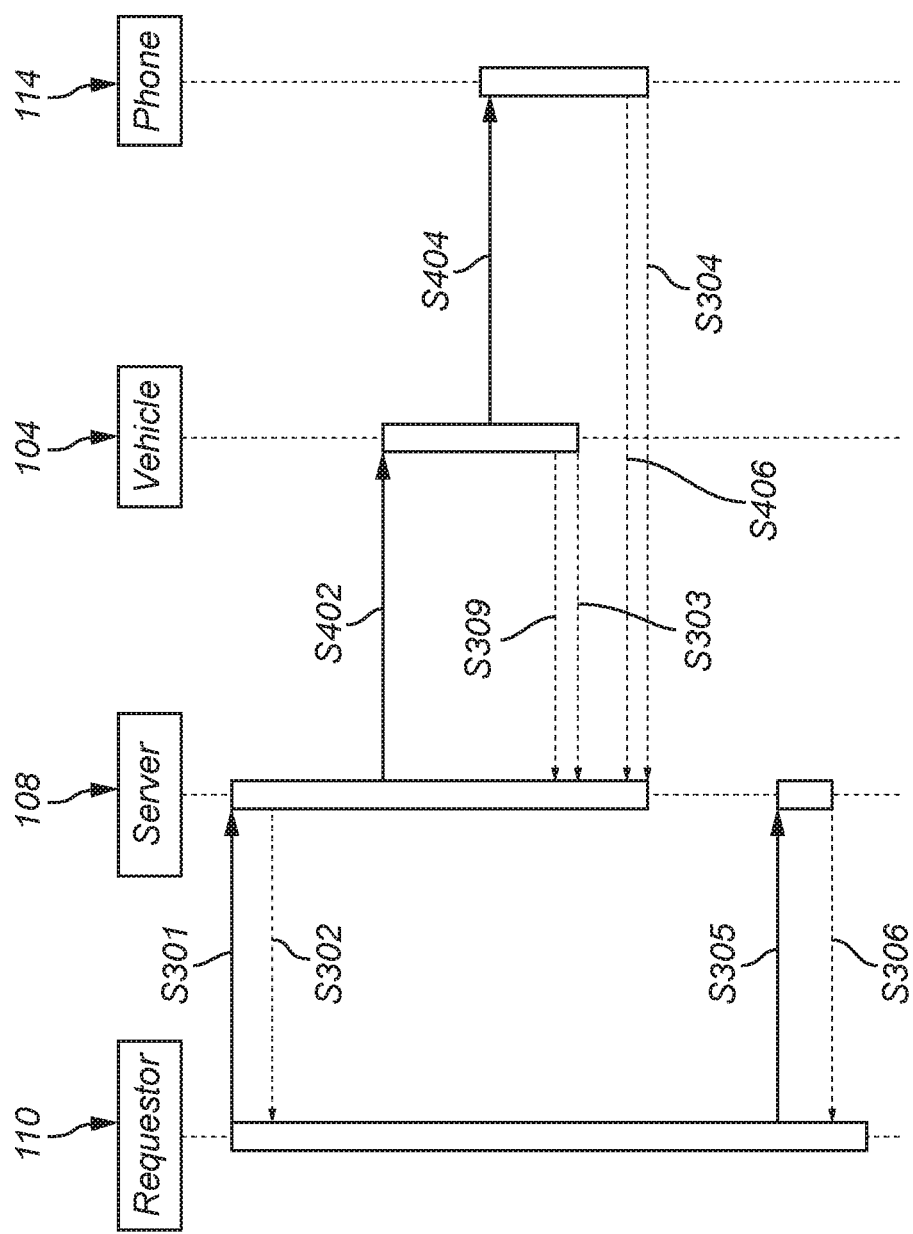

METHOD FOR AUTHENTICATING A USER

CROSS-REFERENCE TO RELATED APPLICATION

The present patent application/patent claims the benefit of priority of European Patent Application No. 17177124.9, filed on Jun. 21, 2017, and entitled "Method for Authenticating a User," the contents of which are incorporated in full by reference herein.

FIELD OF THE INVENTION

The present invention relates to a method and a system for authenticating a user for granting access to a service. The invention also relates to a vehicle communicatively connected with a remote server.

BACKGROUND OF THE INVENTION

It is becoming more common that vehicles are connected with online-based services via the Internet. Although many of such services are non-personal such as e.g. weather information, there may be services that are personal and that should not be accessible to anyone but an authorized user. In addition, other situations not necessarily associated with an online service may also occur where authentication may be desirable, such as for example vehicle handover to a presumably authorized owner.

Consequently, there should be some kind of authentication in place such that some services may be accessed only after successful authentication. Such authentication may include a password that may be entered or in some cases biometric authentication may be used.

However, password authentication is not of sufficient security for all applications and may be compromised. Further, biometric authentication requires some kind of biometry sensor.

Accordingly there is a need for a further authentication type which may provide for high security in a relatively simple manner for authentication for services accessible from a vehicle.

BRIEF SUMMARY OF THE INVENTION

In view of above, it is an object of the present invention to provide an improved authentication method and system for granting or denying access to services accessible from or associated with a vehicle.

According to a first aspect of the invention, there is provided a method for authentication of a user for granting access to a service, the method comprising: receiving, by a vehicle control unit comprised in a vehicle, an authentication token based on a request for authentication for access to the service, the vehicle being in communicative connection with a remote server, sending, by flashing with a light-emitting device comprised in the vehicle, a token sequence based on the authentication token, the token sequence is sent such that the token sequence is received by a light detecting device comprised in a portable electronic device; receiving, by the server, the token sequence from the portable electronic device, and comparing the token sequence with the authentication token, and when the token sequence is determined to match the authentication token, granting access to the service.

The present invention is based on the realization that light-emitting devices of a vehicle light may be used for sending a light signal indicative of a token sequence. The token sequence may be received by a light-detecting device of the portable electronic device and transmitted to the server where it is compared with an authentication token. The portable electronic device and the vehicle are thus not required to be in communication by any wireless means, however, the light-detecting device of the portable device has to be able to receive the token sequence emitted by the light-emitting devices of the vehicle. Further, the request for authentication may be requested by a user of the portable electronic device, thus the same portable electronic device as the one receiving the token sequence which is subsequently received by the server and compared to an initial authentication token.

Accordingly, the invention provides the advantage of a secure way of authenticating a user.

The invention further advantageously provides a secure way of authentication without requiring the portable device to be paired with the vehicle, nor does it require the user to access the interior of the vehicle before authentication. Furthermore, since the token sequence is received by a light-detecting device (e.g. a camera), there is no need to type in the token which thus reduces or even eliminates the risk for typos.

Services may for example be a two factor authentication, consigliere services such as car delivery, car share authentication, or using a phone as key verification, etc., to mention a few exemplary services.

The token sequence is transmitted as sequence of flashes with light-sources comprised in a light-emitting device. For example, a single light source may correspond to a single bit. If the tail lights of the vehicle are used then there may be for example four bits (brake light, left turn signal light, right turn signal light, and reverse light). A sequence of bits may be determined by e.g. at least a subset of the lights on simultaneously, or by flashing with the light one by one from highest bit to lowest bit or vice versa. For example, a light-source emitting light may be interpreted as a "1", and a light source not emitting light may be interpreted as a "0".

A sequence of bits may represent a number or a character in the token sequence. The token sequence may comprise a plurality of numbers or characters, thus the light-emitting device of the vehicle may flash all the light-emitting devices several times for transmitting a token sequence.

The token sequence may be constructed on the portable device based on the flashes of light, e.g. by an application running on the portable device. The constructed sequence is transmitted (e.g. as a sequence of bits) to the server where the comparison with the initial authentication token may be performed. Furthermore, the service may request for the result of the comparison between the token sequence and the authentication token.

According to embodiments of the invention, the method may include receiving, by the server, location information indicative of a present location for the portable electronic device, wherein when the location information is determined to match a location associated with the service, granting access to the service. Hereby, the security is further improved by requiring a match between the location of the portable electronic device and a location of the service. The location of the device may be determined by a GPS of the portable electronic device or from a wireless network that the portable electronic device is connected to. The location of the service may be a location of a physical device that is desirable to get access to, e.g. unlocking of a garage, or activating/de-activating an alarm, vehicle pick-up location, etc.

In another embodiment, the server may receive location information indicative of a present location for the vehicle, wherein when the vehicle location information is determined to match a location associated with the service, granting access to the service. Similar to the above mentioned embodiment, the authentication security is further improved by requiring a matching of locations.

In yet another embodiment, it may be included to receive, by the server, location information indicative of a present location for the vehicle, receiving, by the server, location information indicative of a present location for the portable electronic device, wherein when the vehicle location information is determined to match the portable electronic device location granting access to the service. Similar to the above mentioned embodiment, the authentication security is further improved by requiring a matching of locations.

That locations match includes a complete overlap of locations but also that the locations are not exactly the same. Thus, it may be sufficient for locations to be close such as within the same nearby area, e.g. within about 1 m, 10 m, 100 m.

The light-detecting device may be a camera device such as video camera, wherein the video camera acquires a video of the flashing light-emitting device for receiving the token sequence.

The light-emitting device may comprise a plurality of light sources, wherein each light source is flashable for sending the token sequence, each light source providing a light signal corresponding to a bit for each set of bits comprised in the token sequence.

According to a second aspect of the invention, there is provided a system for authentication of a user for granting access to a service, the user being associated with a portable electronic device comprising a light-detecting device, the system comprising: a light-emitting device and a control unit comprised in a vehicle, wherein the control unit is communicatively connected with a remote server; wherein the server is configured to receive an authentication request from the service, and to provide an authentication token to the vehicle control unit, wherein the vehicle control unit is configured to control the light-emitting device to flash for emitting a token sequence receivable by the light-detecting device of the portable electronic device, wherein the server is configured to receive the token sequence from the portable electronic device, and to compare the token sequence with the authentication token, and, when the token sequence is determined to match the authentication token, grant access to the service.

According to embodiments, the server may be configured to receive location information indicative of a present location for the portable electronic device, wherein when the location information is determined to match a location associated with the service, the server is configured to grant access to the service.

In other embodiments, the server may be configured to receive location information indicative of a present location for the vehicle, wherein when the vehicle location information is determined to match a location associated with the service, granting access to the service.

In yet another embodiment, the server may be configured to receive location information indicative of a present location for the vehicle, and to receive location information indicative of a present location for the portable electronic device, wherein when the vehicle location information is determined to match the portable electronic device location, granting access to the service.

The light-emitting device may comprise at least one of: tail lights or head lights, or turn lights, or side repeaters, for said vehicle.

The portable electronic device may be any portable electronic device comprising a light detecting device and which is connectable with a server. For example, the portable electronic device may be a mobile phone, tablet, laptop, a camera device, or similar present or future portable electronic device.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

This second aspect of the invention provides similar advantages as discussed above in relation to the previous aspect of the invention.

According to a third aspect of the invention, there is provided a vehicle comprising a light-emitting device and a control unit, wherein control unit the is communicatively connected with a remote server, wherein the server is configured to receive an authentication request from a service, and to provide an authentication token to the vehicle control unit, wherein the vehicle control unit is configured to control the light-emitting device to flash for emitting a token sequence receivable by a light-detecting device of a portable electronic device, wherein the server is configured to receive the token sequence from the portable electronic device, and to compare the token sequence with the authentication token, and, when the token sequence is determined to match the authentication token, grant access to the service.

This third aspect of the invention provides similar advantages as discussed above in relation to the previous aspects of the invention.

In summary, the present invention relates to a method and a system for authentication of a user for granting access to a service, the method comprising: receiving, by a vehicle control unit comprised in a vehicle, an authentication token based on a request for authentication for access to the service, the vehicle being in communicative connection with a remote server. A token sequence is sent by flashing with a light-emitting device comprised in the vehicle, the token sequence is based on the authentication token. The token sequence is received by a light detecting device. The token is compared by the server with the authentication token. When the token sequence is determined to match the authentication token, access is granted to the service. The invention also relates to a vehicle implementing the method.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein:

FIG. 2a is a schematic camera view of a lighting device of a vehicle configured to send a token sequence;

FIG. 2b conceptually illustrates a two character/number token sequence sent by flashing the light-emitting devices of a vehicle;

FIG. 3 is a timing diagram conceptually illustrating embodiments of the invention.

DETAILED DESCRIPTION OF EXEMPLARY EMBODIMENTS

Figure 1:
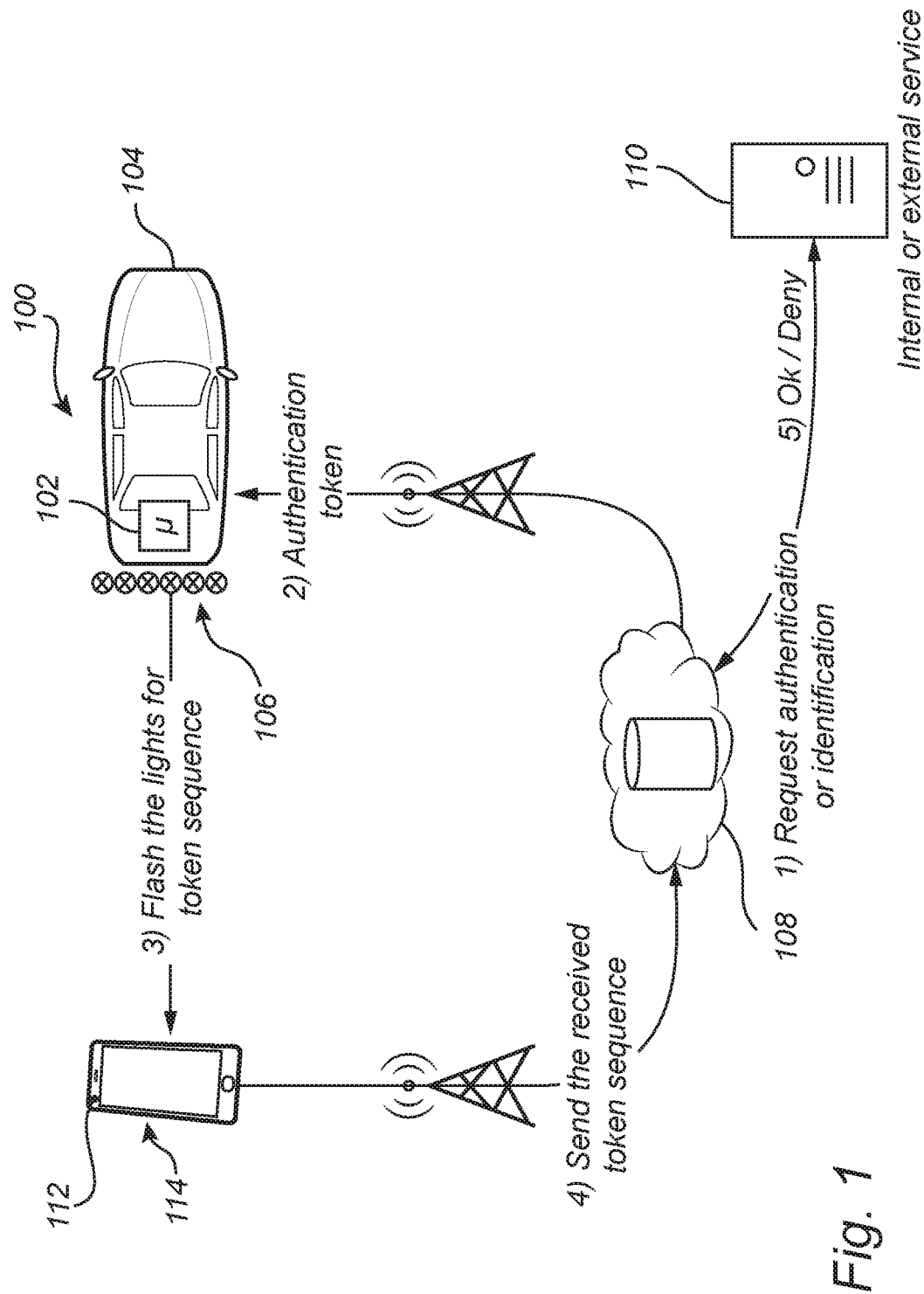
FIG. 1 conceptually illustrates a system for authentication of a user according to embodiments of the invention.

In the present detailed description, various embodiments of the system and method according to the present invention are mainly described with reference to a vehicle in the form of a car and to a portable device in the form of a mobile phone. However, the present invention may equally be used with other vehicles such as trucks, buses, etc., and with other types of portable electronic devices such as tablets, laptops, camera devices, etc. Thus, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 conceptually illustrates an overview of the invention. In FIG. 1, a system 100 according to embodiments of the invention is conceptually shown. The system 100 comprises a control unit 102 comprised in a vehicle 104. Also comprised in the vehicle 104 is a light-emitting device 106. In this presently illustrated embodiment, the light-emitting device is tail light modules 106 of the vehicle 104. The tail light comprises a plurality of light sources as will be described in more detail with reference to FIG. 2.

The control unit 102 in communicatively connected to a remote server 108, preferably by a wireless connection. Upon a request for authentication for access to a service 110, the server 108 receives an authentication request from the service 110. The server 108 subsequently provides an authentication token to the control unit 102 of the vehicle 104. The authentication token is associated with the authentication request from the service 110. For example, the request may be tagged with an ID by the server.

The vehicle control unit 102 controls the light sources of the light-emitting device 106 to flash such that a token sequence is emitted by the flashing light-emitting device 106. The token sequence, provided in the form of a sequence of bits transmitted as light flashes by the flashing light emitting device 106 is received by a light-detecting device 112 comprised in a portable electronic device 114. The light detecting device may be a video camera 112 comprised in a mobile phone 114 (e.g. a Smart phone). The token sequence received by the mobile phone 114 is subsequently received by the server 108 from the mobile phone 114. The server 108 is configured to compare the received token sequence with the previously sent authentication token, and only if a match is found between the received token sequence and the previously sent authentication token is access granted for the user to access the service 110. The comparison may be performed by a direct comparison of the token sequence and the authentication token e.g. bit-by-bit, or the comparison may be performed using e.g. a public key infrastructure (PKI) public/private key pair method.

FIG. 2a illustrates a camera view of a rear part of a vehicle 104. In the camera view, a lighting device 106 in the form of tail lights 106 for the vehicle can be seen. The tail lights 106 comprise a plurality of light sources 202a-f which may be brake lights (202b, 202e), reverse indicating lights (202c, 202f), left turn light (202a), right turn light (202d), in this presently conceptually illustrated embodiment.

For sending a token sequence, the control unit of the vehicle controls the light-emitting device 106 to flash the light sources 202a-f according to the authentication token received by the server 108.

FIG. 2b illustrates two flashing states 205, 206 of the light sources 202a-f representing two characters (205, 206) of a token sequence, each character comprising 6 bits, each of the bits represented by a light source. In the first flashing state 205, the light sources 202c, 202d, 202e are lit, which may be indicative of a "1" for each of the lit light sources; the remaining light sources 202a, 202b, 202f are not lit, each indicative of a "0". In the second flashing state 206, the light sources 202c, 202d, 202e are lit, which may each be indicative of a "1"; the remaining light sources 202a, 202b, 202f are not lit, each indicative of a "0". The token sequence comprising of the two characters each represented by a sequence of bits is transmitted to the server for further processing for authentication of the user.

FIG. 3 illustrates a timing diagram which conceptually describes embodiments of the invention. A request for authentication is received S301 by the server 108 from a requestor such as a service 110. Optionally, the server returns S302 a request ID to the requestor 110.

The server provides an authentication token which is received S402 by a control unit of the vehicle 104. The control unit of the vehicle controls a light-emitting device of the vehicle to transmit S404 a token sequence by flashing with light sources of the light-emitting device. Optionally, the control unit of the vehicle 104 returns S309 a sequence completed status to the server 108 indicative of that the token sequence has been transmitted.

In some embodiments, location information for the vehicle is returned S303 to the server 108. Such location information for the vehicle may be collected by a GPS in the vehicle 104. Furthermore, and according to embodiments of the invention, location information for the portable electronic device 114 may be provided by the portable electronic device 114 to the server 108 in a step S304. In any case, the server receives S406 the token sequence from the portable electronic device 114.

In order to keep track of the request (step S301), a request ID may optionally be transmitted to the server S305 before the final authentication step S306. If the token sequence received from the portable electronic device matches the authentication token, access is granted to the service in step S306; if no match can be found, access is denied, in step S306.

The location information of the vehicle and the location information of the portable electronic device provide another layer of security. It may be required that the location information of the vehicle matches the location information of the portable electronic device or a successful authentication. In a similar manner, a location of the service may be required to match the location of the vehicle and/or the portable device.

Figure 4:
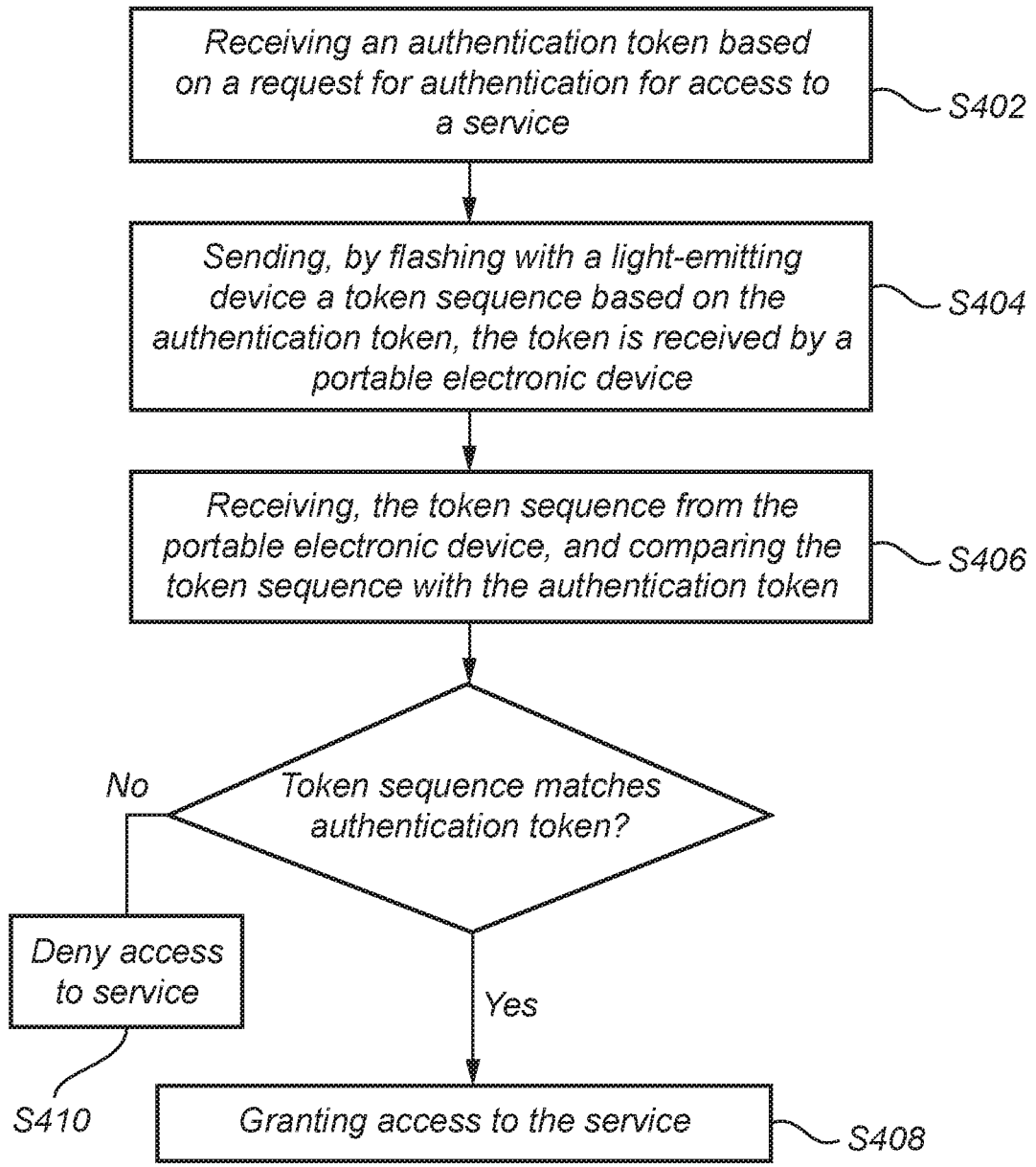
FIG. 4 is a flowchart of method steps according to embodiments of the invention.

FIG. 4 is a flowchart of steps for a method for authentication of a user for granting access to a service. In a first step S402, an authentication token is received by a vehicle control unit comprised in a vehicle, the authentication token is based on a request for authentication for access to the service. The control unit of the vehicle is in communicative connection with a remote server. Subsequently in step S404, a token sequence is sent by flashing with a light-emitting device comprised in the vehicle. The token sequence is based on the authentication token. The token sequence is sent by the light-emitting device such that the token sequence is received by a light detecting device of a portable electronic device. The token sequence is received, by the server, from the portable electronic device and is compared with the authentication token in step S406. When the token sequence is determined to match the authentication token, access is granted S408 to the service. If no match can be concluded, access is denied S410.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

What is claimed is:

1. A method for authentication of a user for granting access to a service, said method comprising:
   receiving, by a vehicle control unit comprised in a vehicle, an authentication token based on a request for authentication for access to said service, said vehicle being in communicative connection with a remote server;
   sending, by flashing with a light-emitting device comprised in said vehicle, a token sequence based on said authentication token, said token sequence is sent via a sequence of light flashes of said light-emitting device with different flashes of different lights of said light-emitting device representing different bits of said authentication token, said token sequence is sent such that said token sequence is received by a light detecting device comprised in a portable electronic device;
   receiving, by said server, said token sequence from said portable electronic device, and comparing said token sequence with said authentication token;
   when said token sequence received from said portable electronic device is determined to match said authentication token, granting access to said service.

2. The method according to claim 1, comprising:
   receiving, by said server, location information indicative of a present location for said portable electronic device, wherein when said location information is determined to match a location associated with the service, granting access to said service.

3. The method according to claim 1, comprising:
   receiving, by said server, location information indicative of a present location for said vehicle, wherein when said vehicle location information is determined to match a location associated with the service, granting access to said service.

4. The method according claim 1, comprising:
   receiving, by said server, location information indicative of a present location for said vehicle,
   receiving, by said server, location information indicative of a present location for said portable electronic device, wherein when said vehicle location information is determined to match the portable electronic device location granting access to said service.

5. The method according to claim 1, wherein said light-detecting device is a video camera, wherein said video camera acquires a video of the flashing light-emitting device for receiving said token sequence.

6. A system for authentication of a user for granting access to a service, said user being associated with a portable electronic device comprising a light-detecting device, said system comprising:
   a light-emitting device and a control unit comprised in a vehicle, wherein said control unit is communicatively connected with a remote server;
   wherein said server is configured to receive an authentication request from said service, and to provide an authentication token to said vehicle control unit,
   wherein said vehicle control unit is configured to control said light-emitting device to flash for emitting a token sequence receivable by said light-detecting device of said portable electronic device, said token sequence is emitted via a sequence of light flashes of said light-emitting device with different flashes of different lights of said light-emitting device representing different bits of said authentication token,
   wherein said server is configured to receive said token sequence from said portable electronic device, and to compare said token sequence with said authentication token, and, when said token sequence is determined to match said authentication token, grant access to said service.

7. The system according to claim 6, wherein said light-detecting device is a video camera, wherein said video camera is configured to acquire a video of the flashing light-emitting device for receiving said token sequence.

8. The system according to claim 6, wherein said server is configured to receive location information indicative of a present location for said portable electronic device, wherein when said location information is determined to match a location associated with the service, said server is configured to grant access to said service.

9. The system according to claim 6, wherein said server is configured to receive location information indicative of a present location for said vehicle, wherein when said vehicle location information is determined to match a location associated with the service, granting access to said service.

10. The system according to claim 6, wherein said server is configured to receive location information indicative of a present location for said vehicle, and to receive location information indicative of a present location for said portable electronic device, wherein when said vehicle location information is determined to match the portable electronic device location, granting access to said service.

11. The system according to claim 6, wherein said light-emitting device comprises at least one of: tail lights or head lights, or turn lights, or side repeaters, for said vehicle.

12. The system according to claim 6, wherein said portable electronic device is a mobile phone.

13. A vehicle comprising a light-emitting device and a control unit, wherein said control unit is communicatively connected with a remote server,
   wherein said server is configured to receive an authentication request from a service, and to provide an authentication token to said vehicle control unit,
   wherein said vehicle control unit is configured to control said light-emitting device to flash for emitting a token sequence receivable by a light-detecting device of a portable electronic device, said token sequence is emitted via a sequence of light flashes of said light-emitting device with different flashes of different lights of said light-emitting device representing different bits of said authentication token, wherein said server is configured to receive said token sequence from said portable electronic device, and to compare said token sequence with said authentication token, and, when said token sequence is determined to match said authentication token, grant access to said service.

14. The vehicle according to claim 13, wherein said light-detecting device is a video camera, wherein said video camera is configured to acquire a video of the flashing light-emitting device for receiving said token sequence.

15. The vehicle according to claim 13, wherein said server is configured to receive location information indicative of a present location for said portable electronic device, wherein when said location information is determined to match a location associated with the service, said server is configured to grant access to said service.

16. The vehicle according to claim 13, wherein said server is configured to receive location information indicative of a present location for said vehicle, wherein when said vehicle location information is determined to match a location associated with the service, granting access to said service.

17. The vehicle according to claim 13, wherein said server is configured to receive location information indicative of a present location for said vehicle, and to receive location information indicative of a present location for said portable electronic device, wherein when said vehicle location information is determined to match the portable electronic device location, granting access to said service.

18. The vehicle according to claim 13, wherein said light-emitting device comprises at least one of: tail lights or head lights, or turn lights, or side repeaters, for said vehicle.

19. The vehicle according to claim 13, wherein said portable electronic device is a mobile phone.

\* \* \* \* \*